United States Patent
Zorba Barah et al.

(10) Patent No.: US 8,441,932 B2
(45) Date of Patent: May 14, 2013

(54) METHOD OF EFFICIENT CHANNEL ALLOCATION IN WIRELESS SYSTEMS

(75) Inventors: Nizar Zorba Barah, Castelldefels (ES); Christos Verikoukis, Castelldefels (ES); Ana Isabel Perez-Neira, Castelldefels (ES)

(73) Assignee: Fundacio Privada Centre Tecnologic de Telecomunicacions de Catalunya, Castelldefels (Barcelona) (ES)

( * ) Notice: Subject to any disclaimer, the term of this patent is extended or adjusted under 35 U.S.C. 154(b) by 390 days.

(21) Appl. No.: 12/918,495

(22) PCT Filed: Jun. 2, 2008

(86) PCT No.: PCT/EP2008/056760
§ 371 (c)(1),
(2), (4) Date: Aug. 20, 2010

(87) PCT Pub. No.: WO2009/135534
PCT Pub. Date: Nov. 12, 2009

(65) Prior Publication Data
US 2010/0329119 A1 Dec. 30, 2010

(30) Foreign Application Priority Data
May 6, 2008 (ES) .................................. 200801308

(51) Int. Cl.
*H04L 12/26* (2006.01)
(52) U.S. Cl.
USPC ......................................................... 370/235
(58) Field of Classification Search .................. 370/235
See application file for complete search history.

(56) References Cited

U.S. PATENT DOCUMENTS 6,449,255 B1 * 9/2002 Waclawsky ................... 370/236
6,459,696 B1 * 10/2002 Carpenter et al. ............ 370/350
(Continued)

FOREIGN PATENT DOCUMENTS

| EP | 1 130 872 | 9/2001 |
|---|---|---|
| EP | 1 370 035 | 12/2003 |
| WO | 2004-068802 | 8/2004 |

OTHER PUBLICATIONS

Q. Zhao and L. Tong, "A Dynamic Queue MAC Protocol for Random Access Channels with Multipacket Reception", Signals, Systems and Computers, 2000. Conference Record of the Thirty-Fourth Asilomar Conference on vol. 2, Oct. 29-Nov. 1, 2000 pp. 1235-1239 vol. 2, Reprint.

(Continued)

*Primary Examiner* — Mark Rinehart
*Assistant Examiner* — Christopher R Crompton
(74) *Attorney, Agent, or Firm* — Katten Muchin Rosenman LLP

(57) ABSTRACT

Method of efficiently allocating a downlink channel from a transmitter (1) to one user selected from a plurality of users (30-1, 30-2, . . . 30-N) in a wireless network providing different service applications to said users (30-1, 30-2, . . . 30-N), which comprises the steps of: at a DLC queue (221) of said transmitter (1), ranking (21, 220) a plurality of M application layer packets to be transmitted to said plurality of users (30-1, 30-2, . . . 30-N), said ranking being based on a quality of service demand associated to each application layer packet, said quality of service demands being in turn associated to respective classes of applications (C1, C2, C3, C4), said DLC queue (221) having length M, M being a natural number, said M packets corresponding to P users of said plurality of users (30-1, 30-2, . . . 30-N), wherein P$\leq$M. It also comprises: dynamically changing said length M of said DLC queue (221) as a function of the different instantaneous values of quality-of-service demands of the different service applications to which said application layer packets relate, thus adjusting the operating point of the network; and at a scheduler (23) of said transmitter (1), allocating a channel to the user having best channel conditions of said group of P users.

8 Claims, 5 Drawing Sheets

U.S. PATENT DOCUMENTS

| | | | |
|---|---|---|---|
| 7,155,539 B2* | 12/2006 | Vange et al. | 709/250 |
| 2002/0150115 A1* | 10/2002 | Onvural et al. | 370/411 |
| 2002/0164963 A1* | 11/2002 | Tehrani et al. | 455/101 |
| 2007/0002750 A1* | 1/2007 | Sang et al. | 370/238 |
| 2007/0002765 A1 | 1/2007 | Kadaba et al. | |
| 2007/0032200 A1* | 2/2007 | Taneja | 455/70 |
| 2008/0037678 A1* | 2/2008 | Shen et al. | 375/267 |
| 2010/0172264 A1* | 7/2010 | Jones | 370/252 |
| 2010/0278152 A1* | 11/2010 | Andreozzi et al. | 370/335 |

OTHER PUBLICATIONS

B. Ata, "Dynamic Control of a Multiclass Queue with Thin Arrival Streams", Operations Research, vol. 54, Issue 5, Sep. 2006, pp. 876-892.

H. Choi et al., "Dynamic Queue Management Mechanism for Service Enhancement in Wireless Intelligent Network Environment", Globecom 1999.

D.I. Choi et al., "Performance Analysis of a Dynamic Priority Queue for Traffic Control of Bursty Traffic in ATM Networks", Communications, IEE Proceedings vol. 148, Issue 3, Jun. 2001 pp. 181-187.

Nizar Zorba et al., "CAC for Multibeam Opportunistic Schemes in Heterogeneous WiMax Systems Under QoS Constraints", IEEE Global Telecommunications Conference, 2007. Piscataway, NJ. USA, Nov. 1, 2007.

International Search Report dated Feb. 23, 2009, from corresponding International Application PCT/EP2008/056760.

* cited by examiner

METHOD OF EFFICIENT CHANNEL ALLOCATION IN WIRELESS SYSTEMS

FIELD OF THE INVENTION

The present invention relates to wireless systems and, in particular, to downlink multiuser scenarios in such systems, wherein different users have different quality of service (QoS) demands.

STATE OF THE ART

The demand for using wireless networks to support real-time delay-sensitive applications such as voice, video streaming or online-gaming has been remarkably growing during the last years. However, current wireless systems fail to fulfil the strict Quality of Service (QoS) requirements in terms of minimum allowed rate, maximum allowed scheduling delay, minimum guaranteed throughput and/or allowed delay jitter for such applications. The fact that the wireless environments are characterized by a harsh scenario for communications adds certain difficulties to guarantee QoS in wireless systems, where the wireless channel suffers from multiple undesired effects such as deep fades and multipath that produce errors to the original information. Therefore, providing QoS by using the scarce resources in the wireless medium is a challenging aspect for such system objective.

Different notions of QoS are available at different communication layers. At the physical layer, QoS means an acceptable Signal-to-Noise-Ratio (SNR) level or Bit Error Rate (BER) at the receiver, while at the Data Link Control (DLC) or higher layers, QoS is usually expressed in terms of minimum guaranteed throughput, maximum allowed delay and/or allowed delay jitter. The fulfillment of QoS requirements depends on procedures that follow each layer. At the DLC layer, QoS guarantees can be provided by appropriate scheduling and resource allocation algorithms, while at the physical layer, adaptation of transmission power, modulation level or symbol rate are used to maintain the link quality.

On the other hand, the consideration of the physical layer transmission characteristics from the higher layers can significantly improve the efficiency of the wireless systems. The vertical coupling between layers is well-known as Cross-Layer. Cross-layer between the physical layer and the higher layers seems to be unavoidable in wireless environments in order to exploit the physical layer instantaneous conditions. Such kind of schemes is needed to guarantee the QoS requirements in heterogeneous traffic systems, where the network includes users with different applications and different QoS restrictions. Cross-Layer further advantages can include improvements in terms of link throughput, reduction of the network latency, energy savings in the mobile nodes or minimization of transmitted power.

An interesting remark concerning the QoS compliance in commercial wireless systems refers to the outage concept, where due to the wireless channel characteristics, the 100% satisfaction of the strict QoS demands is impossible, for what is known as outage in the QoS requirements. The notion of outage is widely used in cellular systems where several commercial systems (e.g. GSM and WCDMA) allow for 2-5% outage. Therefore, the extension of the QoS outage to all wireless systems, when running delay-sensitive applications, seems to be the most tractable approach to asset their efficiency.

With respect to the aforementioned concepts in a downlink system with heterogeneous traffic, several proposals in literature and industry community tackle the dynamic queue consideration to satisfy the maximum allowed scheduling delay requirement:

Q. Zhao and L. Tong propose, in "A dynamic queue MAC protocol for random access channels with multipacket reception", Signals, Systems and Computers, 2000. Conference Record of the Thirty-Fourth Asilomar Conference on Volume 2, 29 October-1 Nov. 2000 Page(s):1235-1239 vol. 2, a MAC protocol for a finite-user slotted channel with multipacket reception (MPR) capability is proposed. By adaptively changing the size of the contention class (defined as a subset of users who can access the channel at the same time) according to the traffic load and the channel MPR capability, the proposed dynamic queue protocol provides superior channel efficiency at high traffic load and minimum delay at low traffic load. However, this protocol is dynamic in terms of traffic load queue and does not deal with the problem of having different users with different quality of service (QoS) demands.

B. Ata, in "Dynamic control of a multiclass queue with this arrival streams" Operations Research, Volume 54, Issue 5, September 2006, Pages 876-892, 2006 ISSN:0030-364X considers an admission control problem for a multiclass, single-server queue. The production system serves multiple demand streams, each having a rigid due-date lead time. To meet the due-date constraints, a system manager may reject orders when a backlog of work is judged to be excessive, thereby incurring lost revenues. However, in this paper, service classes are turned-away based on pre-defined load (packets in the queue) thresholds and on the average mean delay.

H. Choi et al. in "Dynamic Queue Management Mechanism for Service Enhancement in Wireless Intelligent Network Environment", Globecom 1999, Volume 1A, 1999 Page(s):16-20 vol. 1a, proposes a dynamically queuing service feature for service enhancement according to the increment of service subscribers and their mobility. In addition, they propose a Dynamic Queue Manager that handles the queue size to increase call completion rates for service enhancements in wireless intelligent network environments. However, the problem of having different users with different quality of service (QoS) demands is not dealt with.

In "Performance analysis of a dynamic priority queue for traffic control of bursty traffic in ATM networks", Communications, IEE Proceedings-Volume 148, Issue 3, June 2001 Page(s):181-187, Choi, D. I. et al. describe various QoS requirements of bursty traffic and a dynamic priority queue with two types of traffic are proposed and analyzed. The system has two separate buffers to accommodate two types of customers, the capacities of the buffers being assumed to be finite for practical applications. The service order is only determined by the queue length of the first buffer.

International patent application WO 2004/068802 A1 describes a method for determining the optimum allocation of resources amongst services classes. However, the described scheduling is based on a fitness function, where the scheduler takes into account the length of each user's buffer, that can be variable (dynamic) based on the service load of the application.

SUMMARY OF THE INVENTION

The present invention deals with the above-mentioned problem of having different users with different instantaneous quality of service (QoS) demands. A method of dynamically adjusting the length of the users queue in the Data Link Control layer in a downlink wireless system with heterogeneous traffic by using the instantaneous QoS measurements is proposed.

A heterogeneous environment is presented with different Quality of Service (QoS) demands per application. The instantaneous QoS requirements for each user are based on his current application demands, so that the method has to satisfy the QoS for each user, where the QoS demands are very variable among the applications. Such method considers both the physical and application layers characteristics. The queue scheduler always accepts the group of users with most strict QoS demands, and sequentially accepts other groups of users having lower priorities (only when the QoS of the previous groups of users are guaranteed for satisfaction with a certain outage). The length of the queue depends on the instantaneous QoS system requirements, in terms of the user minimum allowed rate, system throughput and the maximum allowed scheduling delay (and jitter) of the delay-sensitive applications, where some outage is considered in the instantaneous QoS requirements of these applications. In other words, the proposed dynamic queue adjustment accounts for the instantaneous QoS satisfaction for all users: the users running QoS sensitive applications are prioritized by the scheduler with respect to users running less QoS sensitive applications.

It is a primary aim of the present invention to provide a method of efficiently allocating a downlink channel from a transmitter to one user selected from a plurality of users in a wireless network providing different service applications to said users, which comprises the steps of: at a DLC queue of the transmitter, ranking a plurality of M application layer packets to be transmitted to the plurality of users, that ranking being based on a quality of service demand associated to each application layer packet, those quality of service demands being in turn associated to respective classes of applications, said DLC queue having length M, M being a natural number, those M packets corresponding to P users of said plurality of users, wherein P≦M. The method also comprises the steps of: dynamically changing the length M of the DLC queue as a function of the different instantaneous values of quality-of-service demands of the different service applications to which those application layer packets relate, thus adjusting the operating point of the network; and at a scheduler of the transmitter, allocating a channel to the user having best channel conditions of said group of P users.

Preferably, the quality-of-service demands are a function of at least one of the following: a maximum allowed scheduling delay, a minimum allowed rate and a minimum guaranteed throughput.

Preferably, the quality-of-service demands are calculated taking into account a predefined value of outage.

In a particular embodiment, the quality-of-service demands are a function of a maximum allowed scheduling delay.

In another particular embodiment, the quality-of-service demands are a function of a maximum allowed scheduling delay and a minimum allowed rate.

In another particular embodiment, the quality-of-service demands are a function of a maximum allowed scheduling delay, a minimum allowed rate and a minimum guaranteed throughput. In this situation, the value of M is calculated from a particular expression detailed later on.

In a particular embodiment, the best channel conditions are evaluated from a measured value of signal-to-noise ratio for each user.

It is another object of the present invention to provide a transmitter comprising means adapted for carrying out the steps of the method already described.

It is another object of the present invention to provide a base station which comprises at least that transmitter.

It is another object of the present invention to provide a wireless communications system which comprises at least that base station.

Finally, it is a further object of the present invention to provide a computer program comprising computer program code means adapted to perform the steps of the mentioned method when the program is run on a computer, a digital signal processor, a field-programmable gate array, an application-specific integrated circuit, a micro-processor, a microcontroller, or any other form of programmable hardware.

The advantages of the proposed invention will become apparent in the description that follows.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DESCRIPTION OF PREFERRED
EMBODIMENTS OF THE INVENTION

In the context of the present invention, the term "approximately" and terms of its family (such as "approximate", "approximation", etc.) should be understood as indicating values or forms very near to those which accompany the aforementioned term. That is to say, a deviation within reasonable limits from an exact value or form should be accepted, because the expert in the technique will understand that such a deviation from the values or forms indicated is inevitable due to measurement inaccuracies, etc. The same applies to the terms "around" and "nearly".

In this context, the following expressions are next defined:
"Scheduling delay": having a packet waiting for transmission at a scheduler, wherein the packet corresponds to a certain user in a multiuser scenario, the maximum scheduling delay is defined as the maximum required time to make the packet to be correctly received at its destination.

"Instantaneous": Instead of average measures of rate, delay, throughput, or any other QoS parameters, some applications demand for instantaneous measures in order to work properly. This implies, in this context, that packets have to be transmitted in a given time interval and not over the average of time intervals. This term "instantaneous" is specially applied to "QoS". Therefore, users ask for QoS demands to be satisfied in a certain time interval (that is to say, "instantaneously").

"Ranking": refers to packets ordering from the most strict QoS demanding packet to the least strict QoS demanding packet. The ordering can be physical, so that the packets are ordered in some physical memory (e.g. queue, buffer, etc.) or virtual, so that the packets are ordered in some list at the system administrator unit.

In this text, the term "comprises" and its derivations (such as "comprising", etc.) should not be understood in an excluding sense, that is, these terms should not be interpreted as excluding the possibility that what is described and defined may include further elements, steps, etc.

Figure 1A:
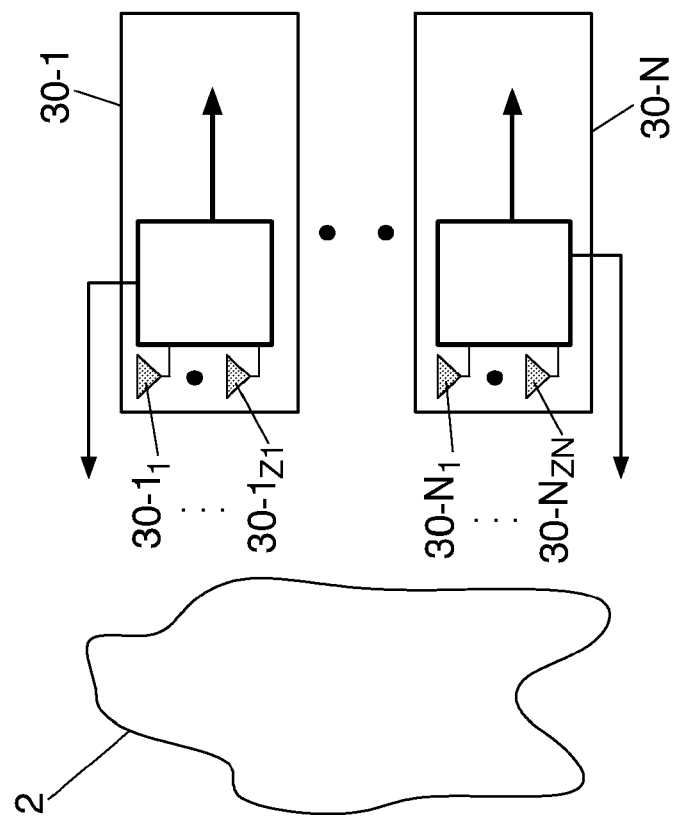
FIGS. 1a and 1b show a block diagram of a wireless network for carrying out the method of the present invention.

FIG. 1a is a schematic representation of the system according to an embodiment of the invention. A wireless network comprises a plurality of base stations, each of them comprising one or more transmitters. FIG. 1a illustrates one transmitter 1 of one base station. The system is, for example, a Wireless Local Area Network (WLAN) system. Other non-limiting examples of the system are WiMax, LTE and UMTS-HSDPA.

As shown in FIG. 1a, transmitter 1 can comprise $n_t$ transmitting antennas 10-1 10-2 ... 10-$n_t$. Each one of the $n_t$ transmitting antennas 10-1 10-2 ... 10-$n_t$ is capable of sending a data flow at each time instant. The system is enabled with multiple codes, frequencies and antennas. For the sake of simplicity, the mathematical presentation is done taking into account a transmitter having a single code, a single frequency and a single transmitting antenna, as illustrated in FIG. 1b.

The system also comprises a plurality of mobile terminals. FIG. 1a shows N mobile terminals, receivers or users 30-1 30-2 ... 30-N attached to said transmitter 1. Each one of said N mobile terminals, receivers or users is equipped with a single or multiple receiving antennas 30-$1_1$ ... 30-$1_{Z1}$ 30-$2_1$ ... 30-$2_{Z2}$ ... 30-$N_1$ ... 30-$N_{ZN}$. Although each of the N users can have a single or several receiving antennas 30-$1_1$ ... 30-$1_{Z1}$ 30-$2_1$ ... 30-$2_{Z2}$ ... 30-$N_1$ ... 30-$N_{ZN}$, as illustrated in FIG. 1a, for the sake of simplicity, the mathematical presentation is done with a single antenna 30-$1_1$ ... 30-$N_1$ per user, as illustrated in FIG. 1b.

Figure 1A:
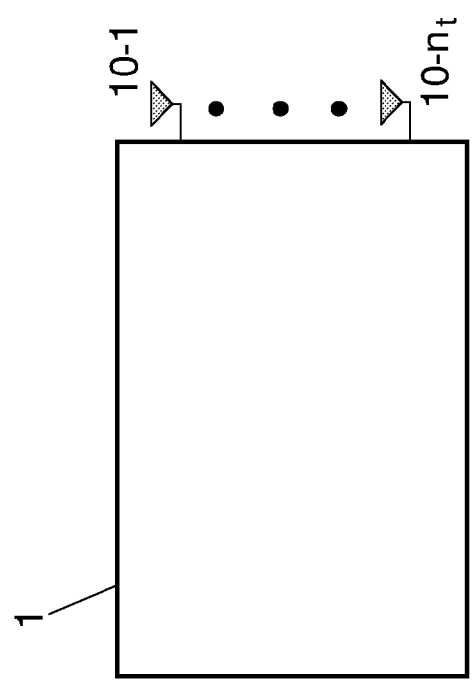
Figure 1B:
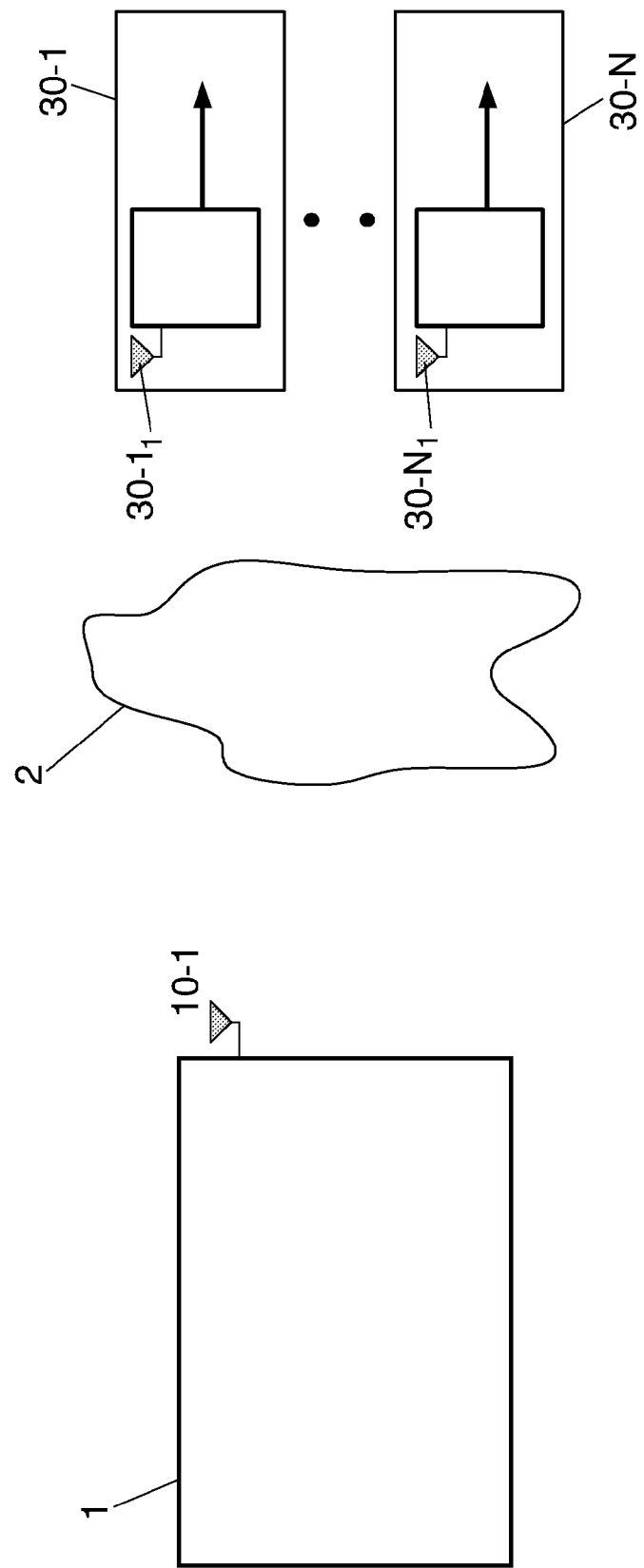

In FIGS. 1a-1b, a multiuser channel 2 is shown, through which information between the transmitter 1 and the N mobile terminals, receivers or users 30-1 30-2 ... 30-N is exchanged. From now on, the term "users" will be used to refer to the N mobile terminals, receivers or users 30-1 30-2 ... 30-N.

The invention focuses on the downlink channel (from transmitter 1 to the N mobile users 30-1 30-2 ... 30-N) where each of the N users is equipped with a single receiving antenna 30-$1_1$ 30-$2_1$ ... 30-$N_1$ and the users are served by the transmitter 1, which is provided with a single transmitting antenna 10-1. This embodiment is shown in FIG. 1b.

In a particular embodiment, a heterogeneous scenario of a wireless network is considered, where users run any of J different classes of applications, J>1. One user can simultaneously run several applications having different respective classes. For the sake of simplicity, a user is assumed to run a single application during a certain time period. This wireless network provides users 30-1, 30-2, ... 30-N with different service applications. For example, class 1 represents voice users (the most delay-sensitive application) and has the highest priority, while Class J is the lowest priority best-effort class. In a particular embodiment, J=4, but the scenario is not limited to four classes.

In a particular embodiment, a channel h(t) is considered between each of the users 30-1 30-2 ... 30-N and the base station (transmitter 1), where a quasi-static block fading model is assumed, which keeps constant through the coherence time, and changes independently between consecutive time intervals with independent and identically distributed (i.i.d.) complex Gaussian entries, with zero mean and unit variance. Therefore, each user 30-1 30-2 ... 30-N is assumed to keep fixed during each fading block and allowed to move from block to block, so that for the QoS objective, this model captures the instantaneous channel fluctuations in a better approach than the circular rings model. The kind of channel h(t) is out of the scope of the present invention. Any other kind of channel can be considered.

Let $s_i(t)$ denote the uncorrelated data symbol to the ith user with $E\{|s_i|^2\}=1$, then the received signal $y_i(t)$ is given by $$y_i(t)=h_i(t)s_i(t)+z_i(t) \quad (1)$$

where $z_i(t)$ is an additive i.i.d. complex noise component with zero mean and $E\{|z_i|^2\}=\sigma^2$. A total transmission power of $P_t=1$ is assumed, and for ease of notation, time index is dropped whenever possible.

The base station comprises a scheduling unit, which performs the method of selecting the most appropriate user 30-1 30-2 ... 30-N and transmits the intended data to that selected user.

The wireless system operates through a maximum throughput scheduler (also called opportunistic scheduler), to boost the system throughput and thus, to enable very high data rates to the users 30-1 30-2 ... 30-N. Within this scenario, the main target is in providing a precise and guaranteed QoS control with a certain outage for all the users 30-1 30-2 ... 30-N, in terms of different parameters, such as the maximum allowed scheduling delay, the minimum allowed rate, the maximum allowed jitter and the minimum guaranteed throughput. In order to achieve this goal, the DLC (Data Link Control) queue length is optimized.

It has to be noted that the minimum allowed rate and the maximum allowed scheduling delay stand as QoS realistic constraints for both delay constrained and tolerant applications.

Figure 2:
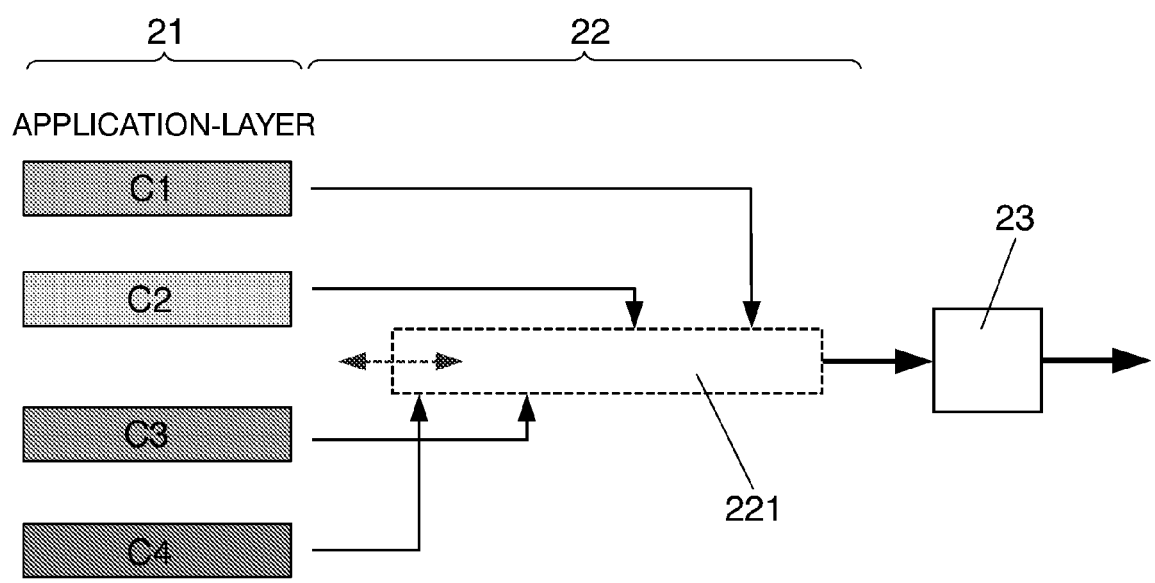
FIG. 2 shows a diagram of the dynamic queue length scheme according to an embodiment of the present invention.

FIG. 2 shows a diagram of the dynamic Data Link Control (DLC) queue scheme of the invention, for efficiently allocating a downlink channel. This scheme is implemented at the transmitter 1 of the base station. Reference sign 21 represents an application layer. In this particular embodiment, as a matter of example, four kinds of services set up by the wireless network operator are represented (J=4): class 1 (C1), class 2 (C2), class 3 (C3) and class 4 (C4). Service applications are assigned one service class or another one (C1, C2, C3, C4) on the basis of the quality-of-service (QoS) required by those applications.

The application layer packets 21 comprise, apart from the actual useful data, an indicator of the instantaneous quality-of-service (QoS) required by the service applications to which they belong. Non-limiting examples of these indicators of instantaneous QoS are: a maximum allowed scheduling delay, a minimum allowed rate and a minimum guaranteed throughput.

At the transmitter 1, the application layer packets 21 to be transmitted to any of those users 30-1, 30-2, ... 30-N are ordered within queue 221 belonging to a Data Link Control (DLC) layer 22. This ordering is based on the class C1, C2, C3, C4 of each packet. In other words, it is based on the instantaneous quality of service demand associated to the service application to which that packet belongs. This is shown in FIG. 2, where those packets having Class 1 (C1), such as those for voice applications, are ordered at the beginning of the queue 221. Similarly, those packets having Class 4 (C4), which is the lowest priority best-effort class, are ordered at the end of the queue 221.

This DLC queue 221 is formed by a group of M packets associated to P users (M, P being natural numbers, M≧P) of that plurality of users 30-1 30-2 ... 30-N of the network. For the sake of simplicity, we consider P=M, so that the length M of the queue 221 can be either expressed in terms of packets or in terms of users, because the size M (considering M=P) represents both. These users of the DLC queue 221 are those to which the application layer packets are addressed. This number M of packets or users forming the DLC queue 221 is dynamic. This means that the system is able of adjusting the length or size of this queue 221. This is explained later.

Once the DLC queue 221 is filled with M users (strictly speaking, with M packets), an opportunistic scheduler 23 (the so called maximum throughput scheduler), located at the transmitter 1, allocates a channel to one of those M users. The scheduler 23 selects the user which has best channel conditions. The scheduler 23 evaluates the channel conditions of each user from previously measured values of a channel parameter. The measuring and evaluation method of the channel conditions and the determination of the best channel conditions are out of the scope of the present invention. A non-limiting example of such parameter from which the channel conditions can be evaluated is the signal-to-noise ratio for each user.

The length or size M of the DLC queue 221 is dynamically changed as a function of the different instantaneous quality-of-service demands of the different service applications which are being used by those selected users. This way, the operating point of the system is adjusted.

Two important aspects to achieve a certain quality of service QoS for the serviced users are the impact of the number of available users 30-1 30-2 . . . 30-N and their exact instantaneous QoS demands. Next, it is explained how the size M of the DLC queue 221 is dynamically adjusted in order to control the different user requirements and their sensitivity to delay and rate. This is performed through a cross-layer scheduling algorithm at the DLC layer 22 of the wireless system. The scheme is based on the already described diagram of FIG. 2, wherein each application layer packet has a given priority in the application layer 21. Packets (and therefore users) having higher priority classes are placed at the beginning of a dynamic DLC queue 221 followed by packets (or users) with lower priorities traffic.

At the physical layer, the wireless system uses different modulation levels or schemes, so that variable transmission rates depending on the channel conditions (measured, for example, through the received SNR) are obtained. An opportunistic scheduler 23 is applied to select the user with the best channel conditions in order to maximize the system throughput.

Regarding the dynamic queue length mechanism 221, when the maximum allowed scheduling delay (or minimum allowed rate or minimum guaranteed throughput) in the delivery of the most delay-sensitive application is smoothly satisfied, the length of the queue 221 can be increased, so that more users can be placed in the DLC layer queue 221. As a consequence, the opportunistic scheduler 23 can select the user with the best channel conditions (for example, highest SNR value) in a bigger pool of choices, increasing by this way the system throughput performance. On the other hand, when the instantaneous QoS requirements (e.g. the maximum allowed scheduling delay) are hardly satisfied, the length of the DLC queue 23 is decreased. Therefore, only packets from users within the higher priority classes can be available in the DLC layer queue 221, so that the opportunistic scheduler 23 can only select among these users. Therefore, the QoS delay performance is enhanced.

For the inclusion of any transmission scheme in commercial standards that run real-time applications, the instantaneous QoS of the users is a very important aspect and can be characterized by several metrics or indicators based on the design objectives. So, QoS can be expressed in terms of rate, reflecting the minimum required rate per user, or in terms of scheduling delay, showing the maximum allowed scheduling delay that a user can tolerate. This proposal considers all of the aforementioned QoS concepts, where the transmission scheme guarantees a minimum allowed rate per user, which is presented by a minimum SNR restriction ($SNR_{th}$) per each user within a given maximum allowed scheduling time delay. In particular, this proposal considers either one requirement (preferably, the maximum allowed scheduling delay), or two requirements (preferably, the maximum allowed scheduling delay plus the minimum allowed rate) or three of them (preferably, the maximum allowed scheduling delay plus the minimum allowed rate plus a minimum guaranteed throughput).

As already indicated, FIG. 1 refers to a wireless network, such as a WLAN, WiMax, LTE or USTM-HSDPA, providing different real-time service applications. Thus, an appropriate transmission scheme (from a practical point of view) is required. For the satisfaction of strict QoS demands, a predefined probability of outage $\xi_{out}$ in the QoS is accepted.

Thus, the dynamic adjustment in the size of the queue 221 shows the trade-off between the users' instantaneous QoS demands and the system throughput, where the best operating point depends on the network operator requirements. To find the best operating point, the length M of the dynamic DLC queue 221 (wherein M is the number of available users at the DLC queue 221) is maximized, subject to some system requirements in terms of the users instantaneous QoS demands. As already introduced, taking into consideration the existence of outage in the QoS satisfaction, a proposed optimization procedure for the system performance can be stated as:

max M $$s.t._1 \text{Prob}\{SNR_i < SNR_{th}\} \leq \xi_{rate} \forall i \in M$$

$$s.t._2 \text{Prob}\{D_{max} < K_i\} \leq \xi_{access} \forall i \in M$$

$$s.t._3 \text{Prob}\{T_i \geq T_{min}\} \geq 1 - \xi_{out} \forall i \in M$$

where $SNR_{th}$ is the minimum required SNR value ("th" referring to a "threshold"), $SNR_i$ is the provided instantaneous SNR value for a user i, where the minimum allowed rate is directly related to $SNR_{th}$ through the well-known rate-SNR relation (for example, minimum allowed rate=$\log(1+SNR_{th})$) and $\xi_{rate}$ is the allowed rate outage. Related to the QoS delay requirements, $D_{max}$ is the maximum allowed scheduling delay, $K_i$ is the obtained scheduling delay value and $\xi_{access}$ is the scheduling delay outage. On the other hand, $T_{min}$ is the minimum guaranteed throughput while $T_i$ is the obtained throughput and $\xi_{out}$ is the total allowed outage (explained later).

This scheme presents the adjustment of the dynamic DLC queue 221 together with the QoS concepts (minimum allowed rate, maximum allowed scheduling delay and minimum guaranteed throughput), where the operator can choose, among the three QoS demands, the most appropriate one or ones for each scenario.

Next, the considered concepts of outage presented in the previous equations are now discussed: the scheduling delay outage (A) and the rate outage (B).

The scheduling delay outage is related to the access scheme answering to the question: When will the i-th user be served? Under section A, the user access process to the system is analysed and the expression for its access probability is calculated. If a user does not get access to the channel within its maximum allowed scheduling delay, it is declared as being in delay outage $\xi_{access}$.

The second outage source comes through the awarded rate and answers to the question: Once the i-th user is selected for transmission, would it receive a data rate below its requirements? Under section B, the rate distribution for the selected user is analysed and the minimum guaranteed rate under a given outage $\xi_{rate}$ is obtained.

Therefore, the two kinds of outage are proposed to meet the total outage $\xi_{out}$, described in section C.

A. Scheduling Delay Outage

In the opportunistic scheduler 23, as a continuous monitorization of the channel quality of the users is performed to select the best one in each slot, then the access to the wireless medium is not guaranteed. Therefore, the study of the access to the medium in maximum throughput schemes is a hard aspect and it offers several challenges.

Next, the maximum access delay (in time slots) until the user is served is defined. So, if an active user in the system does not get access to the channel within its maximum allowed scheduling delay, it is declared as being in access delay, with an outage probability $\xi_{access}$ given by $$\xi_{access} = 1 - V(K) \quad (2)$$

where V(K) is the probability that a maximum of K time slots are required to select a user "i" from a group of N i.i.d. users. V(K) follows a Geometric Distribution as $$V(K) = 1 - (1 - \overline{P}_{access})^K \quad (3)$$

In the opportunistic scheme, each one of the N independent users tries to access the channel with $\overline{P}_{access}$=1/N, therefore from the previous equation, the maximum number of time slots K until the i-th user is selected for transmission, with a probability of delay outage $\xi_{access}$, is given by $$K = \frac{\log(1-V)}{\log(1-\overline{P}_{access})} = \frac{\log(\xi_{access})}{\log(1-1/N)} \quad (4)$$

where the effect of N is shown.

B. Rate Outage

Even though a user is selected for transmission, it may receive a rate that does not satisfy its SNR requirements $SNR_{th}$. As a consequence, it goes into a rate failure and causes an outage to that user. Thus, this section uses the distribution of the serving rate to characterize the rate outage, under a predefined $\xi_{rate}$. Again, the minimum allowed rate is directly related to $SNR_{th}$ through the rate-SNR relation (for example, minimum allowed rate=log(1+$SNR_{th}$)).

Based on the maximum throughput philosophy to deliver service to the users, the serving SNR value is the maximum SNR over the active users in the system. By using the SNR cumulative distribution function (cdf) of i.i.d. complex Gaussian channels $$F(x) = 1 - e^{-(x \cdot \sigma^2)} \quad (5)$$

and as the serving SNR is the maximum over all the users' SNR values, then the serving SNR cdf states as $$FF(x) = (F(x))^N = [1 - e^{-(x \cdot \sigma^2)}]^N \quad (6)$$

Taking into account the cdf of the serving rate, the minimum required rate $SNR_{th}$ for each user with a predefined rate outage $\xi_{rate}$ is $$\xi_{rate} = [1 - e^{-(SNR_{th} \cdot \sigma^2)}]^N \quad (7)$$

The values of $SNR_{th}$ and $\xi_{rate}$ can be computed to meet any system objectives under the number of users N. It is worth noting that the minimum SNR value guarantees the user's decoding process will be successful. In that case a unit step function is used for the detection procedure, making the Packet Success Rate (PSR) to relate to $SNR_{th}$ as $$PSR = \begin{cases} 0 \text{ if } SNR \geq SNR_{th} \\ 1 \text{ if } SNR \leq SNR_{th} \end{cases}$$

where the direct relation to $\xi_{rate}$ is shown. With further manipulations, the $SNR_{th}$ from (7) can be expressed as $$SNR_{th} = \frac{1}{\lambda \sigma^2} \log_2\left(\frac{1}{1 - \sqrt[N]{\xi_{rate}}}\right) \quad (8)$$

where the effect of all the involved parameters is shown, with $\lambda = \log_2(e) = 1.4427$.

C. Total Outage

As previously explained, the opportunistic transmission process comes controlled by two different outage measures, but the total performance has to be defined through a single parameter.

The aforementioned outage probabilities are totally independent, as a user access to the channel happens when its SNR is the maximum over all the other users, but being the user with the highest SNR does not guarantee that this SNR is higher than a given threshold $SNR_{th}$. Therefore, the total outage $\xi_{out}$ is defined as $$\xi_{out} = 1 - (1 - \xi_{access}) \cdot (1 - \xi_{rate}) \quad (9)$$

standing as the global measure of outage.

Next, a maximum scheduling delay is presented: Having a packet of length W bits corresponding to the $i^{th}$ user, and waiting for transmission at the scheduler 23, the maximum scheduling delay is defined as the maximum required time to make the packet to be correctly received at its destination. Notice that this definition encloses the delay resulting from the scheduling process (i.e. the maximum throughput selection) together with the delay caused by the channel transmission (i.e. low data rate), therefore providing a general expression for scheduling delay in opportunistic schemes. Therefore, the maximum number of time slots to select a user under a total outage $\xi_{out}$ is equal to the K access slots formulation in (4), thus defining the maximum scheduling delay.

A numerical example is presented in order to avoid misleading conclusions for the reader: In a scenario with N=10, K=25, $\sigma^2$=1 and $SNR_{th}$=1.3 for each user, it results that $\xi_{access}$=7.2% and $\xi_{rate}$=4.2% are obtained, therefore each user is guaranteed a correct reception of its packet within a maximum scheduling delay of 25 slots and with a total outage of $\xi_{out}$=11.0%.

Next, a guaranteed throughput is presented: In the maximum throughput scheduling policy only a single user does have access to each slot. As the user is not always served, then that user receives a zero throughput over several time slots. Therefore, a normalized throughput over the time is required. Notice that the definition of normalized throughput accounts for the waiting time and hence, for the corresponding scheduling delay expression. With a system bandwidth $B_W$ and $t_s$ as the time slot (assumed to match the channel coherence time), the normalized minimum guaranteed throughput defined in bits/slot states as $$T = \frac{B_w t_s \log(1 - 1/N) \log_2\left(1 + \frac{1}{\lambda \sigma^2} \log_2\left(\frac{1}{1 - \sqrt[N]{\xi_{rate}}}\right)\right)}{\log(\xi_{access})} \quad (10)$$

obtaining the throughput with all the involved optimization parameters.

Simulations and Results

To evaluate the performance of the proposed dynamic DLC queue 221, a heterogeneous scenario is set up where users with four types of applications (C1, C2, C3, C4) coexist in the system. A total of N=20 users (30-1, 30-2, . . . , 30-20) are available in the scenario with 5 users for each service traffic class C1, C2, C3, C4. The length of the packets for classes C1, C2, C3 and C4 are 100, 512, 1024 and 2312 bytes, respectively. Class 1 has the highest priority, while class 4 is the lowest priority class. A saturated system is considered, where all users 30-1, 30-2, . . . , 30-20 have at least one packet ready for transmission. A total system bandwidth of 20 MHz and a slot service time of 1 ms is assumed in the simulations. When a user is selected for transmission, it is awarded all the resources of the system. An Indoor complex i.i.d. Gaussian channel with ~CN(0, 1) entries is considered. The opportunistic scheduler 23 is employed to select the user with the best received SNR. A time scale of $10^6$ channel visualizations is employed to display the channel continuous variations.

Figure 3:
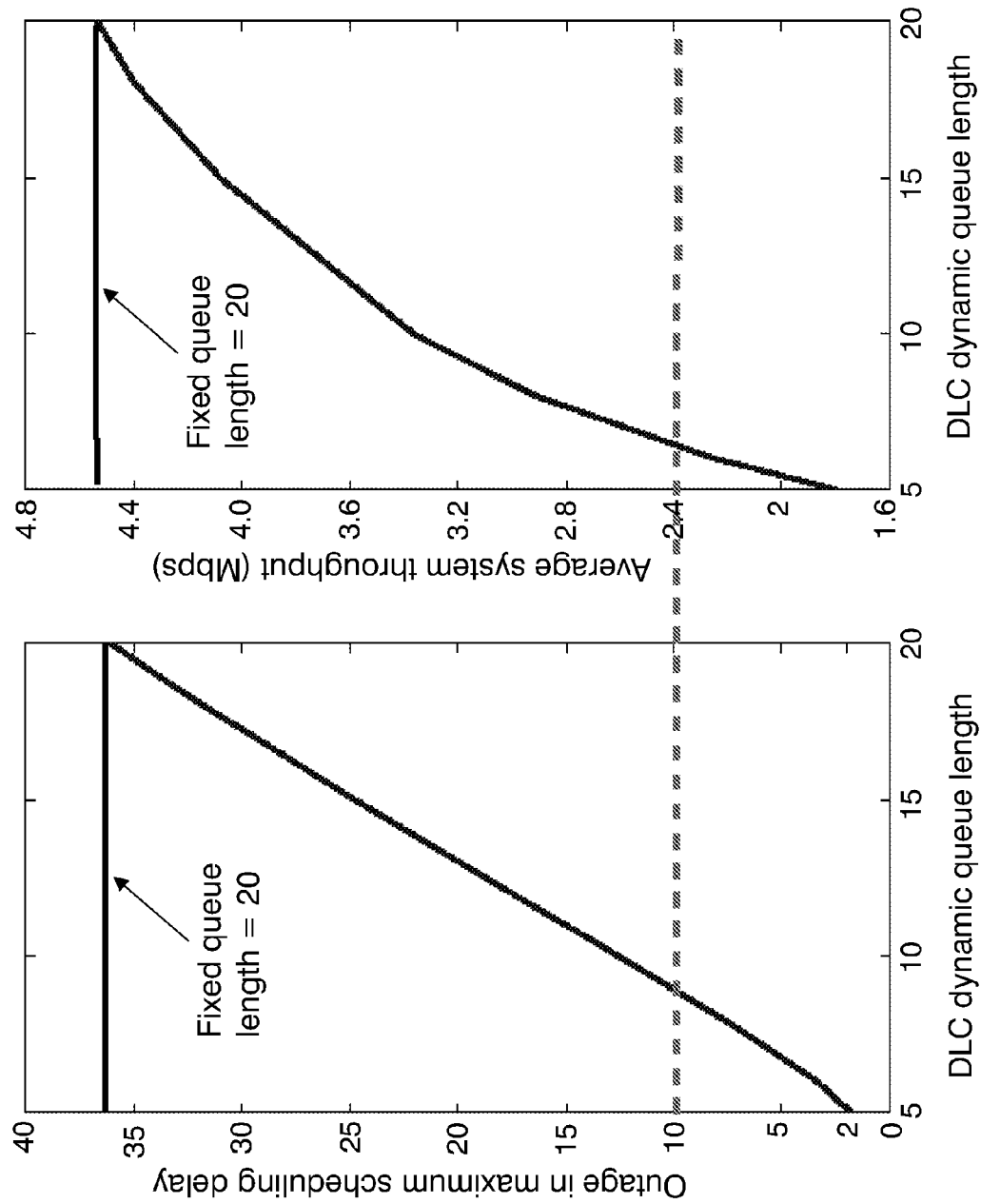
FIGS. 3a-3b show two graphics with simulations results of the method of the invention.

In FIG. 3a, the percentage of the outage in the maximum allowed scheduling delay satisfaction for Class 1 (C1) users (Y-axis) versus the length of the DLC queue 221 (X-axis) is presented. A maximum allowed scheduling delay of 20 ms is assumed for the class 1 users. It can be seen from FIG. 3a that when the length of the DLC queue 221 is M=5 (so that only users of the class 1 (C1) exist in the DLC queue 221), the maximum allowed scheduling delay is guaranteed for the 98% of the cases (i.e. 2% outage). On the other hand, FIG. 3b shows that, in order to increase the system aggregate throughput (not the guaranteed throughput in expression (10), but the average aggregate throughput in the system) a longer length of the DLC queue 221 is required, so that more users are accepted in the system. This means that class 1 users have lower chances to get access to the channel, which has a direct impact on the time delivery of their packets. As a consequence, the maximum allowed scheduling delay restriction is violated with higher probability and the outage in the delay requirements increases with the length of the queue. FIGS. 3a-3b also show the delay and throughput performance for a fixed DLC queue length M=20, with larger outage as well as better throughput behaviour. The dotted line shows an example of what the system can provide in terms of QoS, so that if the class 1 application requires for 20 ms maximum allowed scheduling delay and it can allow for 10% outage, the example shows that 9 users (5 users from class 1 (C1) and 4 users from class 2 (C2)) can be accepted in the dynamic queue, and these 9 users enable the system to offer an average throughput of 2.4 Mbps.

Figure 4:
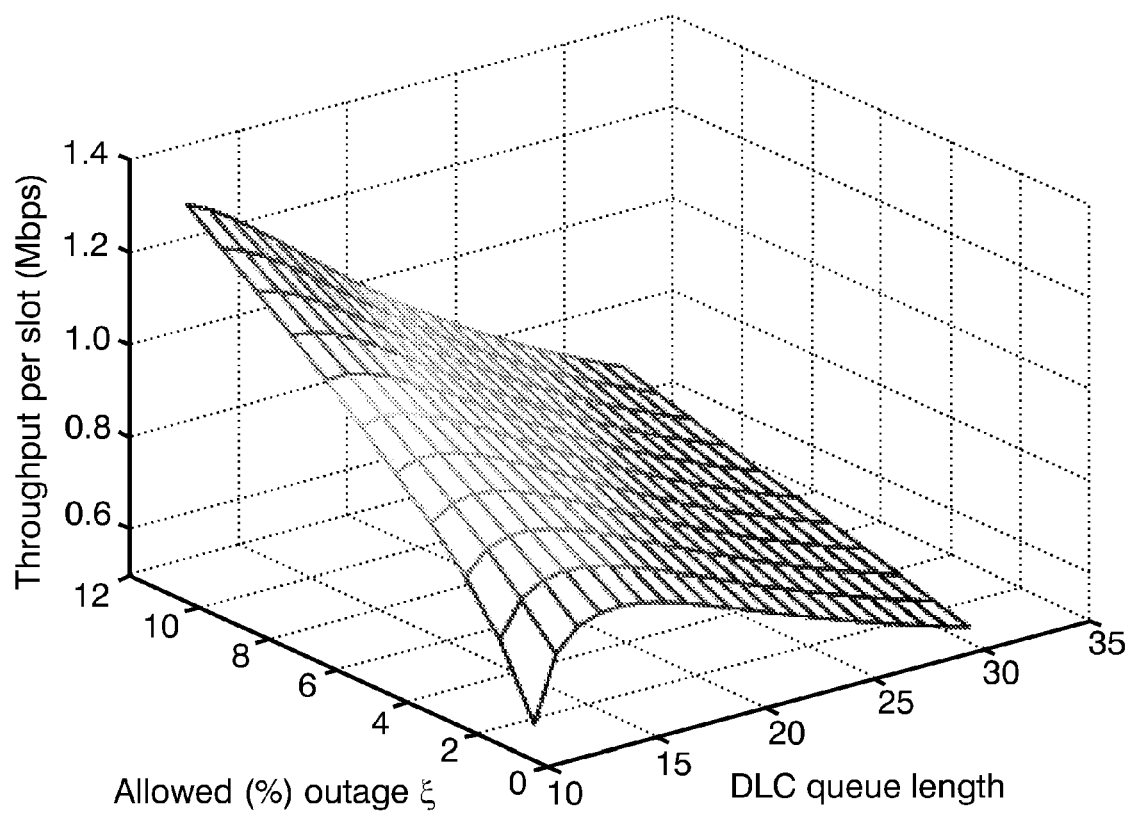
FIG. 4 shows a minimum guaranteed-throughput for a variable DLC layer queue length and outage.

FIG. 4 depicts the system minimum guaranteed throughput to each user for a scenario having a demanded minimum rate of 15 Mbps with variable DLC queue length, as well as a variable allowed outage $\xi_{out}$. It can be seen that there is an optimum DLC queue length M, where the guaranteed throughput has a maximum value for each considered outage. Therefore, the system can be optimized on the basis of its demands and restrictions, to all or to specific classes of users.

In summary, the present invention presents a method of efficiently allocating a downlink wireless channel by dynamically adjusting the length of the Data Link Control (DLC) queue. Among the users 30-1 30-2 . . . , 30-N with one or more packets in the queue, the user with the best channel conditions is selected 23 for transmission. Therefore, the length of the queue defines the maximum achievable throughput of the system. On the other hand, the instantaneous QoS requirements of delay sensitive applications are guaranteed with short DLC queue lengths (dynamically adjusted). A trade-off appears between the system aggregate throughput and the users QoS demands.

A maximum length M is allowed in order to obtain the highest aggregate system throughput, but restricted to the satisfaction of the users QoS. Several alternative QoS measures and their formulations are presented, so that a wireless operator can choose among them for the most suitable ones for each scenario characteristics and users QoS demands.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method of efficiently allocating a downlink channel from a transmitter to a user selected from a plurality of users in a wireless network, the network providing different service applications to the plurality of users, the method comprising the steps of:
   (a) at a data link control (DLC) queue of the transmitter, ranking a plurality of M application layer packets to be transmitted to the plurality of users based on a quality-of-service demand associated with each application layer packet, the quality-of-service demands being associated with respective classes of service applications, the DLC queue having a length M packets, M being a natural number, M packets corresponding to P users of the plurality of users, wherein P≤M, each of the plurality of users being configured for simultaneously running several service applications having different classes;
   (b) dynamically changing the length M packets of DLC queue as a function of different instantaneous values of quality-of-service demands of the different service applications to which the service application layer packets relate to adjust an operating point of the network; and
   (c) at a scheduler of the transmitter, selecting the user having best channel conditions of P users and allocating a channel the selected user;
   wherein the quality-of-service demands are a function of a maximum allowed scheduling delay, a minimum allowed rate, or a minimum guaranteed throughput;
   wherein the value of M is calculated from
   max M $s.t._1 \text{Prob}\{SNR_i < SNR_{th}\} \leq \xi_{rate} \forall i \in M$ $s.t._2 \text{Prob}\{D_{max} < K_i\} \leq \xi_{access} \forall i \in M$ $s.t._3 \text{Prob}\{T_i \geq T_{min}\} \geq 1 - \xi_{out} \forall i \in M$ where $SNR_{th}$ is a minimum required SNR value, $SNR_i$ is the provided instantaneous SNR value for a user i, $\xi_{rate}$ is an allowed rate outage, $D_{max}$ is a maximum allowed scheduling delay, $K_i$ is the obtained scheduling delay value, $\xi_{access}$ is a scheduling delay outage, $T_{min}$ is a minimum guaranteed throughput, $T_i$ is an obtained throughput, $\xi_{out}$ is a total allowed outage and the minimum allowed rate is directly related to $SNR_{th}$ through a rate-SNR relation.

2. The method of claim 1, wherein the quality-of-service demands are calculated taking into account a predefined value of outage.

3. The method of claim 1, wherein the quality-of-service demands are a function of a maximum allowed scheduling delay and a minimum allowed rate.

4. The method of claim 1, wherein the best channel conditions are evaluated from a measured value of signal-to-noise ratio for each the P users of the plurality of users.

5. A transmitter comprising:
  an antenna;
  a data link control; and
  a scheduler
  wherein a downlink channel from the transmitter to a user selected from a plurality of users in a wireless network allocated according to a method, the network providing different service applications to the plurality of users, the method comprising the steps of
  (a) at a data link control (DLC) queue of the transmitter, ranking a plurality of M application layer packets to be transmitted to the plurality of users based on a quality-of-service demand associated with each application layer packet, the quality-of-service demands being associated with respective classes of service applications, the DLC queue having a length M packets, M being a natural number, M packets corresponding to P users of the plurality of users, wherein P≦M, each of the plurality of users being configured for simultaneously running several service applications having different classes;
  (b) dynamically changing the length M packets of DLC queue as a function of different instantaneous values of quality-of-service demands of the different service applications to which the service application layer packets relate to adjust an operating point of the network; and
  (c) at a scheduler of the transmitter, selecting the user having best channel conditions of P users and allocating a channel the selected user;
  wherein the quality-of-service demands are a function of a maximum allowed scheduling delay, a minimum allowed rate, or a minimum guaranteed throughput;
  wherein the value of M is calculated from
  max M $$s.t._1 \text{Prob}\{SNR_i < SNR_{th}\} \leq \xi_{rate} \forall i \in M$$

$$s.t._2 \text{Prob}\{D_{max} < K_i\} \leq \xi_{access} \forall i \in M$$

$$s.t._3 \text{Prob}\{T_i \geq T_{min}\} \geq 1 - \xi_{out} \forall i \in M$$

where $SNR_{th}$ is a minimum required SNR value, $SNR_i$ is the provided instantaneous SNR value for a user i, $\xi_{rate}$ is an allowed rate outage, $D_{max}$ is a maximum allowed scheduling delay, $K_i$ is the obtained scheduling delay value, $\xi_{access}$ is a scheduling delay outage, $T_{min}$ is a minimum guaranteed throughput, $T_i$ is an obtained throughput, $\xi_{out}$ is a total allowed outage and the minimum allowed rate is directly related to $SNR_{th}$ through a rate-SNR relation.

6. A base station comprising:
  a transmitter having an antenna, a data link control, and a scheduler;
  wherein a downlink channel from the transmitter to a user selected from a plurality of users in a wireless network is allocated according to a method, the network providing different service applications to the plurality of users, the method comprising the steps of
  (a) at a data link control (DLC) queue of the transmitter, ranking a plurality of M application layer packets to be transmitted to the plurality of users based on a quality-of-service demand associated with each application layer packet, the quality-of-service demands being associated with respective classes of service applications, the DLC queue having a length M packets, M being a natural number, M packets corresponding to P users of the plurality of users, wherein P≦M, each of the plurality of users being configured for simultaneously running several service applications having different classes;
  (b) dynamically changing the length M packets of DLC queue as a function of different instantaneous values of quality-of-service demands of the different service applications to which the service application layer packets relate to adjust an operating point of the network; and
  (c) at a scheduler of the transmitter, selecting the user having best channel conditions of P users and allocating a channel the selected user;
  wherein the quality-of-service demands are a function of a maximum allowed scheduling delay, a minimum allowed rate, or a minimum guaranteed throughput;
  wherein the value of M is calculated from
  max M $$s.t._1 \text{Prob}\{SNR_i < SNR_{th}\} \leq \xi_{rate} \forall i \in M$$

$$s.t._2 \text{Prob}\{D_{max} < K_i\} \leq \xi_{access} \forall i \in M$$

$$s.t._3 \text{Prob}\{T_i \geq T_{min}\} \geq 1 - \xi_{out} \forall i \in M$$

where $SNR_{th}$ is a minimum required SNR value, $SNR_i$ is the provided instantaneous SNR value for a user i, $\xi_{rate}$ is an allowed rate outage, $D_{max}$ is a maximum allowed scheduling delay, $K_i$ is the obtained scheduling delay value, $\xi_{access}$ is a scheduling delay outage, $T_{min}$ is a minimum guaranteed throughput, $T_i$ is an obtained throughput, $\xi_{out}$ is a total allowed outage and the minimum allowed rate is directly related to $SNR_{th}$ through a rate-SNR relation.

7. A wireless network comprising:
  a base station comprising a transmitter having an antenna, a data link control, and a scheduler;
  wherein a downlink channel from the transmitter to a user selected from a plurality of users in a wireless network is allocated according to a method, the network providing different service applications to the plurality of users, the method comprising the steps of
  (a) at a data link control (DLC) queue of the transmitter, ranking a plurality of M application layer packets to be transmitted to the plurality of users based on a quality-of-service demand associated with each application layer packet, the quality-of-service demands being associated with respective classes of service applications, the DLC queue having a length M packets, M being a natural number, M packets corresponding to P users of the plurality of users, wherein P≦M, each of the plurality of users being configured for simultaneously running several service applications having different classes;
  (b) dynamically changing the length M packets of DLC queue as a function of different instantaneous values of quality-of-service demands of the different service application to which the service application layer packets relate to adjust an operating point of the network; and
  (c) at a scheduler of the transmitter, selecting the user having best channel conditions of P users and allocating a channel the selected user;

wherein the quality-of-service demands are a function of a maximum allowed scheduling delay, a minimum allowed rate, or a minimum guaranteed throughput;

wherein the value of M is calculated from max M $$s.t._1 \text{Prob}\{SNR_i < SNR_{th}\} \leq \xi_{rate} \forall i \in M$$

$$s.t._2 \text{Prob}\{D_{max} < K_i\} \leq \xi_{access} \forall i \in M$$

$$s.t._3 \text{Prob}\{T_i \geq T_{min}\} \geq 1 - \xi_{out} \forall i \in M$$

where $SNR_{th}$ is a minimum required SNR value, $SNR_i$ is the provided instantaneous SNR value for a user i, $\xi_{rate}$ is an allowed rate outage, $D_{max}$ is a maximum allowed scheduling delay, $K_i$ is the obtained scheduling delay value, $\xi_{access}$ is a scheduling delay outage, $T_{min}$ is a minimum guaranteed throughput, $T_i$ is an obtained throughput, $\xi_{out}$ is a total allowed outage and the minimum allowed rate is directly related to $SNR_{th}$ through a rate-SNR relation.

8. A non-transitory computer readable data storage comprising:

computer executable code to perform the steps of a method of efficiently allocating a downlink channel from a transmitter to a user selected from a plurality of users in a wireless network, the network providing different service applications to the plurality of users, the method comprising the steps of:

(a) at a data link control (DLC) queue of the transmitter, ranking a plurality of M application layer packets to be transmitted to the plurality of users based on a quality-of-service demand associated with each application layer packet, the quality-of-service demands being associated with respective classes of service applications, the DLC queue having a length M packets, M being a natural number, M packets corresponding to P users of the plurality of users, wherein P≦M, each of the plurality of users being configured for simultaneously running several service applications having different classes;

(b) dynamically changing the length M packets of DLC queue as a function of different instantaneous values of quality-of-service demands of the different service applications to which the service application layer packets relate to adjust an operating point of the network; and (c) at a scheduler of the transmitter, selecting the user having best channel conditions of P channel the selected user;

wherein the quality-of-service demands are a function of a maximum allowed scheduling delay, a minimum allowed rate, or a minimum guaranteed throughput;

wherein the value of M is calculated from max M $$s.t._1 \text{Prob}\{SNR_i < SNR_{th}\} \leq \xi_{rate} \forall i \in M$$

$$s.t._2 \text{Prob}\{D_{max} < K_i\} \leq \xi_{access} \forall i \in M$$

$$s.t._3 \text{Prob}\{T_i \geq T_{min}\} \geq 1 - \xi_{out} \forall i \in M$$

where $SNR_{th}$ is a minimum required SNR value, $SNR_i$ is the provided instantaneous SNR value for a user i, $\xi_{rate}$ is an allowed rate outage, $D_{max}$ is a maximum allowed scheduler delay, $K_i$ is the obtained scheduler delay value, $\xi_{access}$ is a scheduling delay outage, $T_{min}$ is a minimum guaranteed throughput, $T_i$ is an obtained throughput, $\xi_{out}$ is a total allowed outage and the minimum allowed rate is directly related to $SNR_{th}$ through a rate-SNR relation.

\* \* \* \* \*